US008676520B2

(12) United States Patent  
Olson et al.

(10) Patent No.: US 8,676,520 B2
(45) Date of Patent: *Mar. 18, 2014

(54) METHOD AND SYSTEM FOR DETERMINING AN AMOUNT OF A LIQUID ENERGY COMMODITY IN STORAGE IN AN UNDERGROUND CAVERN

(71) Applicant: Genscape Intangible Holding, Inc., Louisville, KY (US)

(72) Inventors: Susan Olson, Louisville, KY (US); Deirdre Alphenaar, Prospect, KY (US); Abudi Zein, Jersey City, NJ (US); Jason Fuchs, Louisville, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,688

(22) Filed: May 22, 2013

(65) Prior Publication Data

US 2013/0261997 A1    Oct. 3, 2013

Related U.S. Application Data

(63) Continuation of application No. 13/410,671, filed on Mar. 2, 2012, now Pat. No. 8,473,227.

(60) Provisional application No. 61/448,439, filed on Mar. 2, 2011.

(51) Int. Cl.
| G01F 17/00 | (2006.01) |
| G01C 13/00 | (2006.01) |
| G01V 9/02 | (2006.01) |
| G01C 11/04 | (2006.01) |

(52) U.S. Cl.
CPC ............... *G01C 13/008* (2013.01); *G01V 9/02* (2013.01); *G01C 11/04* (2013.01)
USPC .......................................... 702/55; 702/156

(58) Field of Classification Search
CPC ........ G01C 13/00; G01C 13/08; G01C 11/04; G01V 9/02; G06T 7/0051
USPC ....................................................... 702/55, 156
See application file for complete search history.

(56) References Cited

U.S. PATENT DOCUMENTS 3,049,920 A * 8/1962 Allen .............................. 73/291
3,277,654 A * 10/1966 Shiver ............................ 405/55

(Continued)

OTHER PUBLICATIONS

ISA/KR, International Preliminary Report on Patentability for related International Application No. PCT/US2012/027437, mailed Sep. 12, 2013.

*Primary Examiner* — John Breene
*Assistant Examiner* — Timothy H Hwang
(74) *Attorney, Agent, or Firm* — Stites & Harbison, PLLC; David W. Nagle, Jr.

(57) ABSTRACT

A method for determining an amount of a liquid energy commodity in storage in an underground cavern generally comprises the steps of: establishing a volume function for a brine pond associated with the underground cavern; acquiring an image of the brine pond; transmitting the acquired image to a central processing facility; analyzing the acquired image to calculate a depth of the brine in the brine pond; estimating the volume of the brine in the brine pond based on the calculated depth and using the volume function; determining the amount of the liquid energy commodity in storage in the underground cavern associated with the brine pond based on the estimated volume of the brine in the brine pond; and communicating information about the amount of the liquid energy commodity in storage to a third-party market participant.

8 Claims, 9 Drawing Sheets

(56) References Cited

U.S. PATENT DOCUMENTS

| | | | |
|---|---|---|---|
| 4,249,518 A * | 2/1981 | Holt | 126/567 |
| 4,720,995 A * | 1/1988 | Thiel | 73/149 |
| 4,821,164 A * | 4/1989 | Swanson | 702/5 |
| 5,129,759 A * | 7/1992 | Bishop | 405/59 |
| 6,078,867 A * | 6/2000 | Plumb et al. | 702/6 |
| 6,374,187 B1 * | 4/2002 | Knight et al. | 702/51 |
| 2013/0138349 A1 * | 5/2013 | Kram | 702/12 |

* cited by examiner

METHOD AND SYSTEM FOR DETERMINING AN AMOUNT OF A LIQUID ENERGY COMMODITY IN STORAGE IN AN UNDERGROUND CAVERN

CROSS-REFERENCE TO RELATED APPLICATIONS

The present application is a continuation of U.S. patent application Ser. No. 13/410,671 filed on Mar. 2, 2012, which claims priority to U.S. Provisional Patent Application Ser. No. 61/448,439 filed on Mar. 2, 2011, the entire disclosures of which are incorporated herein by reference.

BACKGROUND OF THE INVENTION

The present invention related to a method and system for determining an amount of a liquid energy commodity, such as crude oil, natural gas liquids (NGL), and other liquid hydrocarbons, in storage in an underground cavern.

Liquid energy commodities, such as crude oil, natural gas liquids (NGL), and other liquid hydrocarbons, comprise a multi-billion dollar economic market. These commodities are bought and sold by many parties, and as with any traded market, information about the traded commodities is very valuable to market participants. Specifically, the operations of the various components and facilities of the production, transportation, storage, and distribution systems for each of these commodities can have significant impacts on the price and availability of these commodities, making information about said operations valuable. Furthermore, such information generally is not disclosed publicly by the various component owners or operators, and access to said information is therefore limited.

SUMMARY OF THE INVENTION

The present invention is a method and system for determining an amount of a liquid energy commodity, such as crude oil, natural gas liquids (NGL), and other liquid hydrocarbons, in storage in an underground cavern.

In accordance with the method and system of the present invention, each brine pond in a particular underground storage location is researched using publicly available resources, visual inspection, satellite imaging, SONAR, hydrographic LiDAR or other methods. All physical contours and other relevant information about the brine pond, including, for example, pond wall slope(s), k or $k_i$, maximum pond depth, $z_0$, pond perimeter as a function of depth, $P(z)$, volume of pond at maximum depth, $V_0$, and pond areas as a function of depth, $A(z)$, are stored in a database.

From this information, a function is derived that describes the brine pond volume, $V(z)$, which is the volume in underground storage, as a function of the depth, z, of the brine pond at any given time.

The type of liquid energy commodity(ies) in the underground storage caverns associated with each pond is (are) also researched, and that data is stored in the database.

Then, on a predetermined schedule, an inspection of each brine pond at the particular underground storage location is conducted, for example, via a fixed camera with the brine ponds of interest in the frame of reference or an aircraft carrying a camera that flies over the location. Such an inspection includes the acquisition of one or more visual images of the brine pond.

The acquired images of each brine pond are then preferably transmitted to a central processing facility. The acquired images are then analyzed, preferably through the use of a digital computer program. One form of analysis is to use imaging software to identify and trace two contours over the image. The first contour represents the top edge of the pond, and the second contour represents the level of the brine within the pond at the time the image was acquired. If the imagery is acquired using a moving frame of reference, such as imagery taken from an airplane or helicopter, in order to minimize error introduced from variable angles of inclination with respect to the frame, it is preferred to introduce a pre-processing step where all images and their associated contours are transformed to a common frame of reference before subsequent processing.

Then, the average perpendicular distance between the contours is determined from a predetermined number of discrete measurements. Multiplying the average perpendicular distance by the slope of the wall of the brine bond gives the depth, z, of the pond.

With the depth, z, the volume of the pond is then estimated using the volume function, $V(z)$.

Finally, the amount of the liquid energy commodity in storage is determined. In many cases, the estimated volume of the brine pond is assumed to be approximately equal to the volume of the liquid energy commodity in storage in an underground cavern associated with the brine pond.

Once the analysis of each brine pond in a particular location is completed, information about the estimated volumes can then be communicated to market participants and other interested parties, i.e., third parties who would not ordinarily have ready access to such information about the amount of liquid energy commodity in underground storage at a given time.

DETAILED DESCRIPTION OF THE INVENTION

Figure 1:
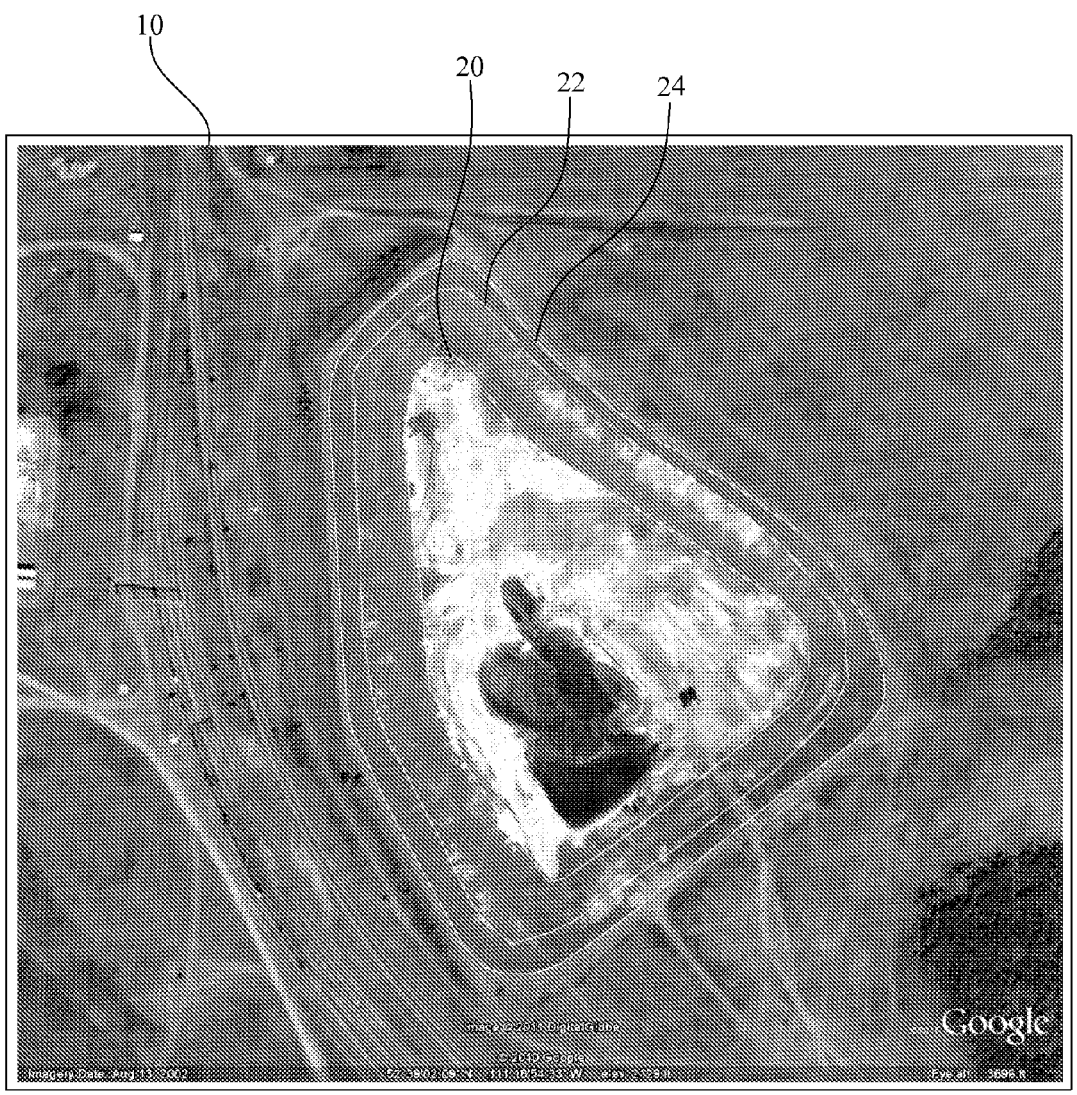
FIG. 1 is an aerial image of a brine pond in an empty state, with multiple contours traced over the image.

The present invention is a method and system for determining an amount of a liquid energy commodity, such as crude oil, natural gas liquids (NGL), and other liquid hydrocarbons, in storage in an underground cavern.

In addition to aboveground storage, liquid energy commodities, such as crude oil, natural gas liquids (NGL), and other liquid hydrocarbons, are stored in underground caverns.

In North America, these caverns are typically man-made, hollowed out of a geological salt formation by pumping in water and extracting the brine in a process known as "solution mining." It is common for large reservoirs of national emergency supplies of crude oil, the so-called Strategic Petroleum Reserve (SPR), to be stored in such underground caverns. The United States SPR is stored in underground caverns in Texas and Louisiana, and the SPR caverns generally range in capacity from 6 to 35 million barrels. See http://www.fe.doe.gov/programs/reserves/spr/spr-sites.html.

For another example, natural gas liquids (NGL) are another liquid energy commodity that is commonly stored in underground caverns. One of two major storage hubs in the U.S. is in Mont Belvieu, Tex. The storage area includes approximately 34 underground caverns with a total storage of about 100 million barrels.

Within an underground storage cavern, the crude oil or other liquid energy commodity floats on a volume of brine. Therefore, associated with a single cavern or multiple caverns is a volume of brine used to keep the cavern full when the liquid energy commodity has been extracted. The brine helps maintain the cavern wall integrity so that the walls of the salt cavern are not eroded. When the liquid energy commodity needs to be extracted from the cavern, brine is pumped into the cavern, and the liquid energy commodity is displaced into a pipeline to transport the liquid energy commodity out of the facility. When the liquid energy commodity needs to be injected into the cavern, it is pumped in and the brine is displaced from the cavern.

One common method of maintaining the necessary brine volume is to use an aboveground pond to store the excess brine. If the brine pond and associated storage caverns form a closed system, the volume of the liquid energy commodity in storage is approximately equal to the volume of brine in the brine pond.

In accordance with the method and system of the present invention, each brine pond in a particular underground storage location is researched using publicly available resources, visual inspection, satellite imaging, SONAR, hydrographic LiDAR or other methods. In this regard, a detailed understanding of the pond shape and dimensions is required in order to associate a particular level of brine in a pond with an associated volume of brine contained in the pond. The simplest case is a brine pond which has been designed to be a rectangular solid shape, where the depth of brine in the pond directly corresponds with the volume of brine in the pond. In cases where the pond topology is not a simple geometric shape, public sources such as topographically accurate maps are then used. All physical contours and other relevant information about the brine pond, including, for example, pond wall slope(s), k or $k_i$, maximum pond depth, $z_0$, pond perimeter as a function of depth, $P(z)$, volume of pond at maximum depth, $V_0$, and pond areas as a function of depth, $A(z)$, are stored in a database. Such a database would preferably be stored in a memory of a computer system. As will become clearer in the discussion that follows, the constant $V_0$ is determined from an estimation of the volume in the brine pond at the minimum pond depth from engineering documentation or from an analysis using the same methods prescribed herein. $V_0$ may also be calculated if treated as an unknown in the equation for V(z) below with other volumes of reference known.

From this information, a function is derived that describes the brine pond volume, V(z), which is the volume in underground storage, as a function of the depth, z, of the brine pond at any given time.

$$V(z) = \int_z^{z_0} A(z)dz \tag{1}$$

For example, in determining physical contours of a particular brine pond and establishing a volume function based on the physical contours of the brine pond, an image 10 is acquired, as shown in FIG. 1. In this case, the brine pond is in a substantially empty state as it is under construction. Then, as also shown in FIG. 1, two or more contours of the brine pond are traced over the image 10. Such contours could also be derived from engineering documentation or drawings. In this case, there are three contours traced on the image 10: a first contour 20 representing the bottom of the brine pond; a second contour 22 representing the maximum pond level; and a third contour 24 representing the top of the pond, i.e., the top edge of the berm surrounding the brine pond.

Figure 2:
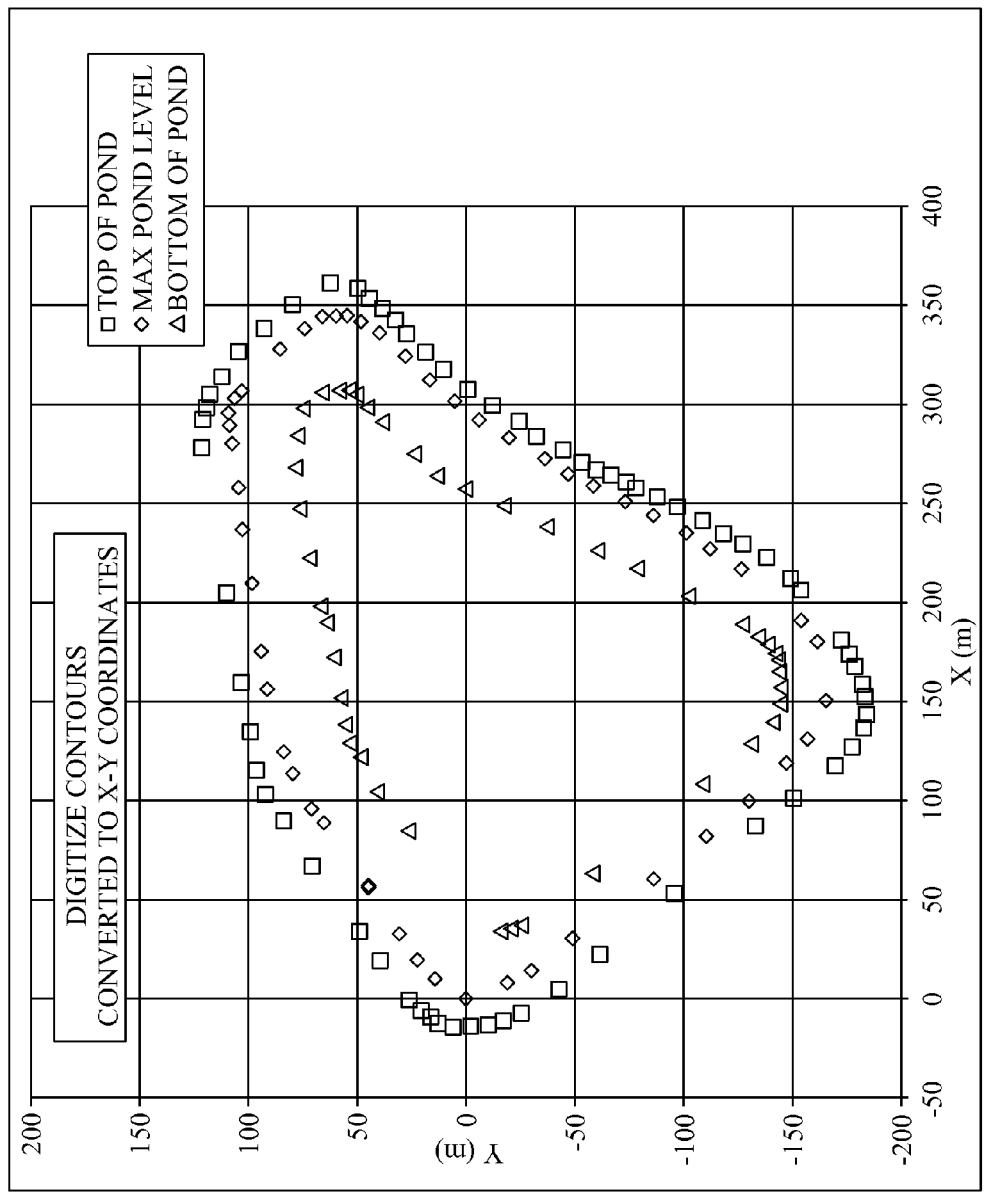
FIG. 2 is a plot of the contours of FIG. 1 as digitized into X-Y coordinates.

Once the contours have been identified and traced over the image 10, those contours are digitized into X-Y coordinates, as shown in FIG. 2

The area bounded by each of the contours is then calculated.

The next step is to determine the depth, z, for each of the contours. In this example, the first step in determining the depth is to calculate the average perpendicular distance between each contour and the contour 24 representing the top of the pond. The depth, z, of each contour is then determined by multiplying the slope of the wall of the brine pond by the average perpendicular distance between each contour and the contour 24 representing the top of the pond. The slope of the brine pond walls is known from engineering documentation or other sources, or the slope can be estimated based on knowledge of best practices of pond construction.

Figure 3:
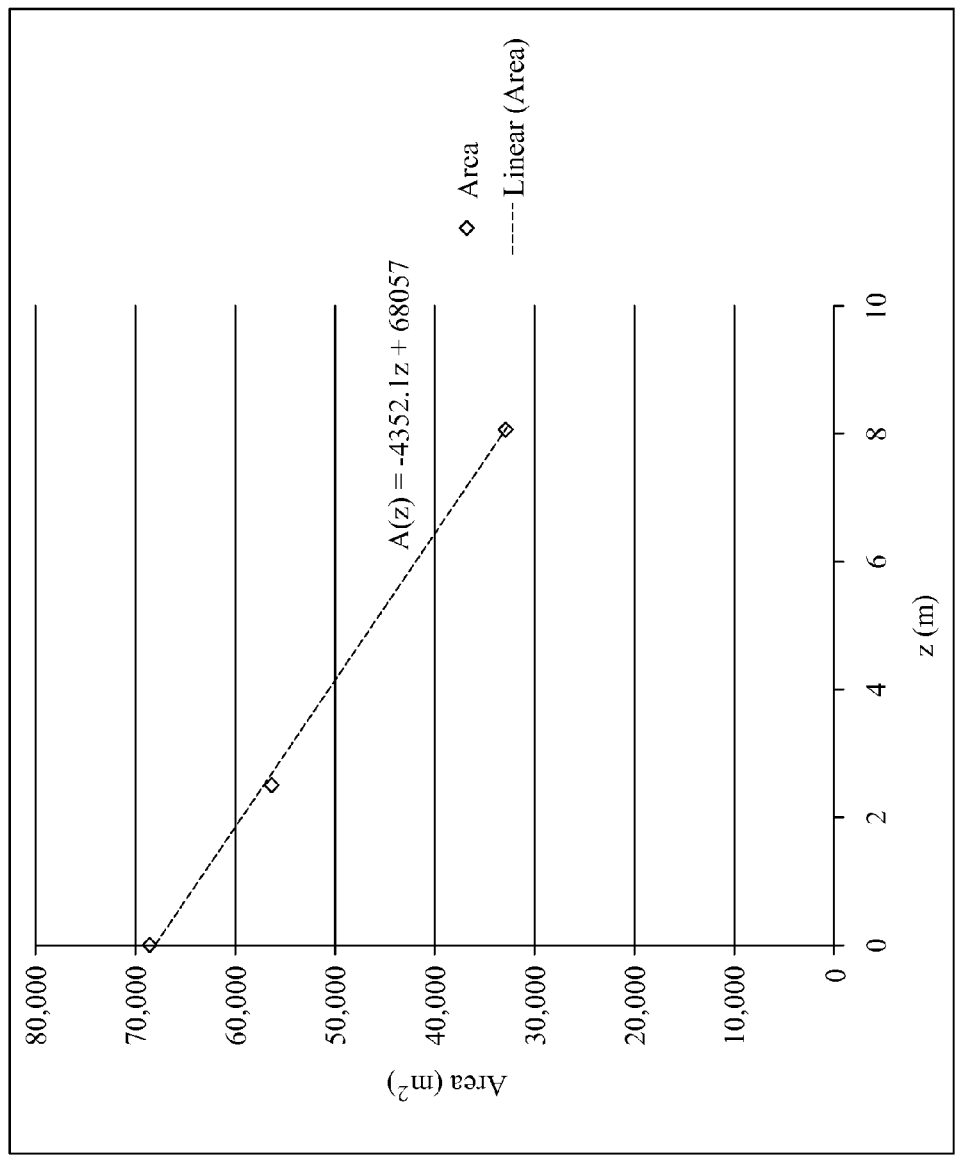
FIG. 3 is a plot illustrating an area function calculated as a function of the depth of the brine pond of FIG. 1.

Lastly, using a linear regression or other appropriate fitting, an area function, A(z), is calculated as a function of the pond depth, z. For example, such a linear regression is shown in the chart of FIG. 3. Specifically, with respect to the example shown in FIGS. 1-3, the area function derived from the brine pond in an empty state is:

$$A(z) = 68057 - 4352z \tag{2}$$

And, the volume of the irregular shaped brine pond is:

$$V(z) = 68057(z_0 - z) - 4352/2 * (z_0^2 - z^2) + 112017 \tag{3}$$

where $z_0$ equals maximum pond depth, and
where 112017 is a constant to account for a minimum pond volume.

This volume function, V(z), is also stored in the database.

The type of liquid energy commodity(ies) in the underground storage caverns associated with each pond is (are) also researched, and that data is stored in the database. Furthermore, depending on the source and methods of their production, crude oils vary in chemical and physical properties and are typically classified by American Petroleum Institute gravity (or API number), which is a measure of how heavy or light a crude oil is relative to water. If crude oil is stored in the underground storage location of interest, the API number or similar information about the type of crude oil may also be stored in the database.

Figure 8:
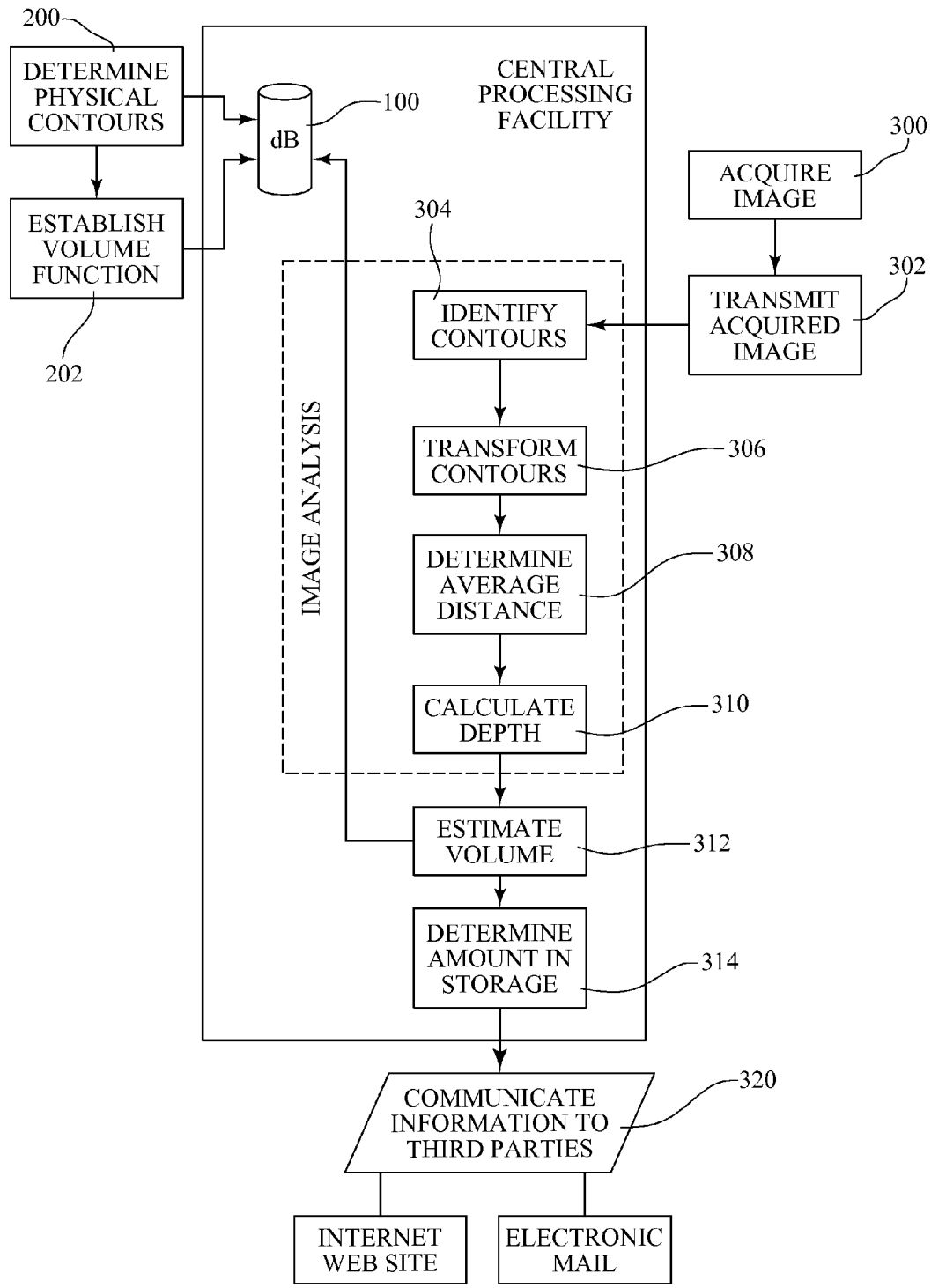
FIG. 8 is a flow chart depicting the general functionality of an exemplary implementation of the method and system of the present invention.

Referring now to the flow chart of FIG. 8, and reiterating the steps described above, the physical contours of the brine pond are stored in the database 100 of the central processing facility, as indicated by block 200, and the established volume function is also stored in the database 100 of the central processing facility, as indicated by block 202.

Then, on a predetermined schedule, an inspection of each brine pond at the particular underground storage location is conducted, for example, via a fixed camera with the brine ponds of interest in the frame of reference or an aircraft carrying a camera that flies over the location. Such an inspection includes the acquisition of one or more visual images of the brine pond, as indicated by block 300 of FIG. 8. For example, such images could include photographic images, satellite images, infrared images, or any other type of imagery that would provide delineation of the boundaries of each brine pond, i.e., the top edge of each brine pond and the level of brine within each pond.

The acquired images of each brine pond are then preferably transmitted to a central processing facility, as indicated by block 302 of FIG. 8. The acquired images are then analyzed, preferably through the use of a digital computer program, i.e., computer-readable instructions stored in a memory and executed by a processor of a computer system. Thus, execution of the requisite routines and subroutines can be carried out using standard programming techniques and languages. With benefit of the following description, such programming is readily accomplished by one of ordinary skill in the art.

Figure 4:
FIG. 4 is an aerial image of the brine pond of FIG. 1 when the brine pond is storing a significant volume of brine.

One form of analysis is to use imaging software, such as ImageJ (which is a publicly available software program develop by the National Institutes of Health and is available at http://rsbweb.nih.gov/ij/), to identify and trace two contours over the image, as indicated by block 304 of FIG. 8. The first contour represents the top edge of the pond, and the second contour represents the level of the brine within the pond at the time the image was acquired. FIG. 4 is an aerial image of the brine pond of FIG. 1 when the brine pond is storing a significant volume of brine, and the first and second contours are traced over this image.

If the imagery is acquired using a moving frame of reference, such as imagery taken from an airplane or helicopter, in order to minimize error introduced from variable angles of inclination with respect to the frame, it is preferred to introduce a pre-processing step where all images and their associated contours are transformed to a common frame of reference before subsequent processing, as indicated by block 306 of FIG. 8.

Figure 5:
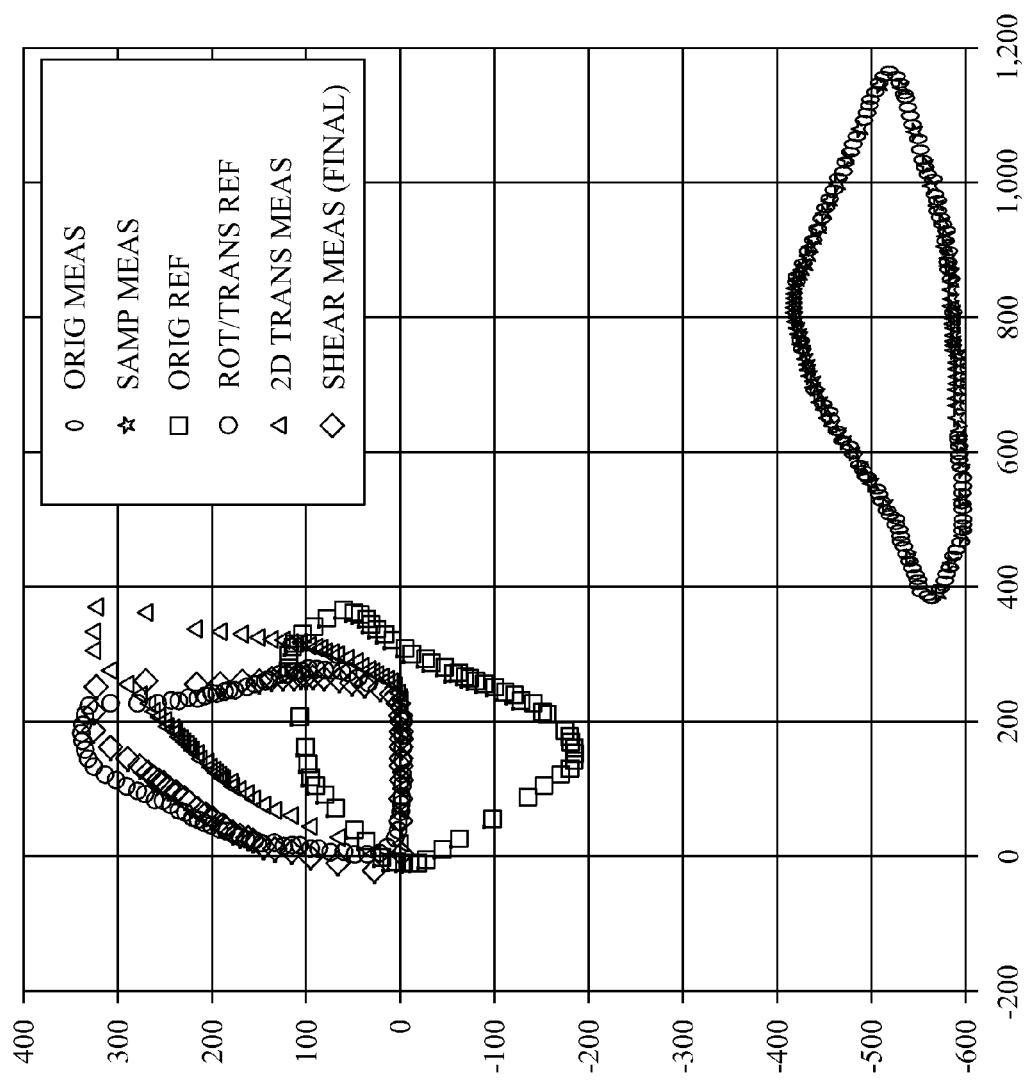
FIG. 5 is a plot illustrating the application of a 2D linear transform to the image and contours of FIG. 4.

This pre-processing step begins by using a generalized coordinate transform on the identified contour to scale each of these contours to physical dimensions. An example of a 2D linear transform is illustrated in FIG. 5. Using the perimeter of the top edge of the brine pond, which is known from the research on the brine pond, as a reference, the contour of the top edge of the brine pond is then scaled, sheared and rotated to match the reference. This transform is exemplified by the equations below and can be accomplished using a software program such as Matlab®, which is a commercially available software package marketed and licensed by The Mathworks, Inc. of Natick, Mass.

$$X_n = ax_n + by_n + c \tag{4a}$$

$$Y_n = dx_n + ey_n + f \tag{4b}$$

where $x_n$ and $y_n$ are the $n^{th}$ coordinate pair of either measured contour; a, b, c, d, e and f are constants derived from the coordinate transformation; and $X_n$ and $Y_n$ are the transformed coordinates.

The transform is stored as an intermediate set of variables in the analysis process. The same transform is then applied to the second contour which is representative of the level of the brine in the brine pond. The first and second contours after the transform are then represented according to the physical dimensions of the brine pond.

Once the pre-processing step has been performed, the average perpendicular distance between the contours, $P_{er}$, is determined from a predetermined number of discrete measurements, as indicated by block 308 of FIG. 8.

Figure 6:
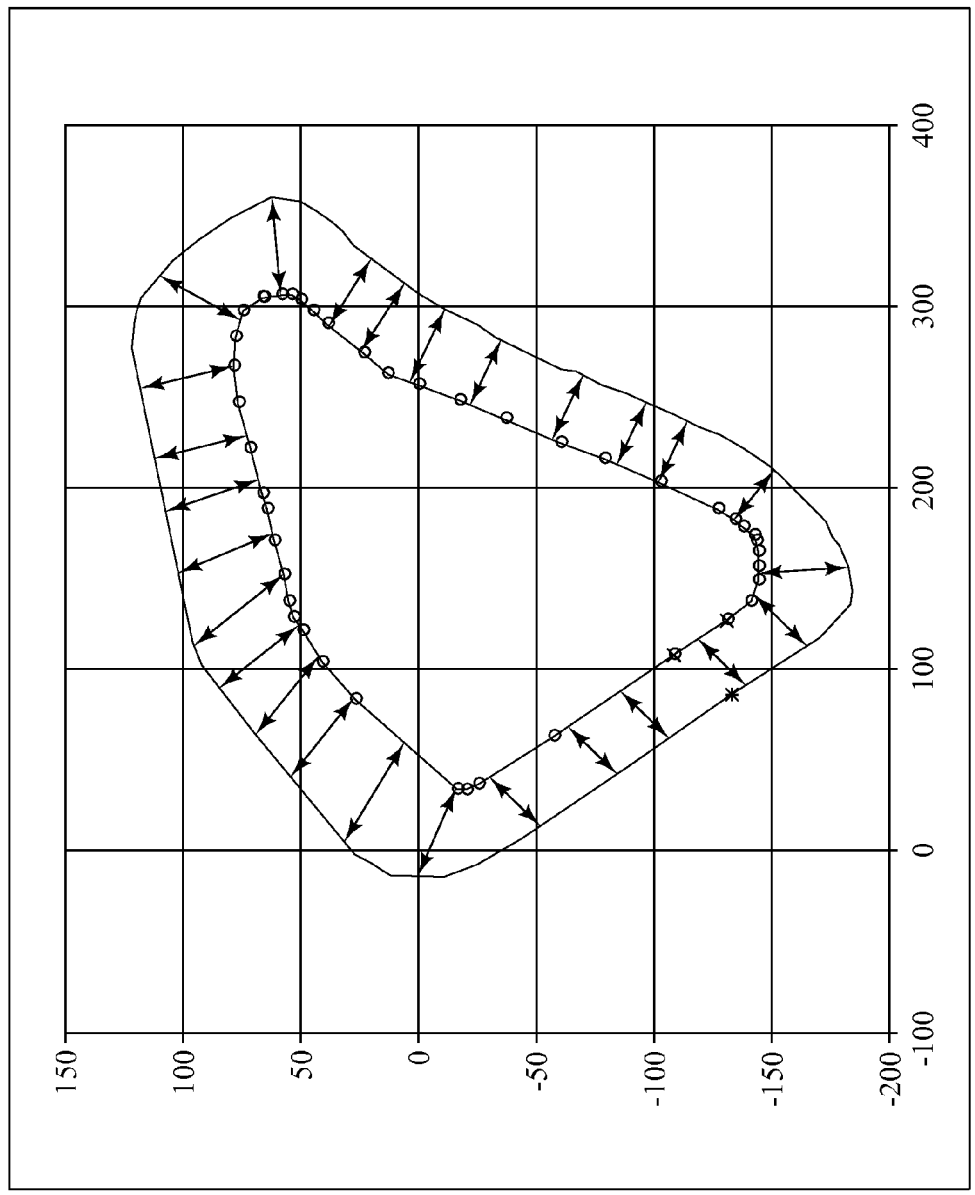
FIG. 6 is a plot illustrating how the average perpendicular distance between the contours in FIG. 4 is determined from a predetermined number of discrete measurements.

For example, FIG. 6 illustrates how such measurements are made. Multiplying average perpendicular distance by the slope of the wall of the brine bond gives the depth, z, of the pond.

$$z = kP_{der} \tag{5}$$

If the slope of the wall of the brine pond varies as a function of the perimeter, the slope can be expressed as a function of the perpendicular distance.

$$k = k(P_{der}) \tag{6}$$

Then, and as indicated by block 310 of FIG. 8, the depth may be computed in the following manner.

$$z = \frac{1}{2\pi} \int_0^{2\pi} k[P_{der}(\theta)] d\theta \times P_{der} \tag{7}$$

where θ is an angular reference coordinate with an origin inside the pond perimeter.

With the depth, z, the volume of the pond is then estimated using the volume function, V(z), from equation (3) above, as indicated by block 312 of FIG. 8.

In cases where the frame of reference of acquired images of a brine pond is fixed or is known geospatially, another form of analysis is to detect contour edges on the pond image and to derive an image pixel area for each contour. In this regard, edges in images are areas with strong intensity contrasts, i.e., a significant change in intensity from one pixel to the next. There are various methods and techniques for detecting edges in an image, which can be generally grouped into two categories: gradient and Laplacian methods. A gradient method detects the edges by looking for the maximum and minimum in the first derivative of the image. A Laplacian method searches for zero crossings in the second derivative of the image to find edges. In any event, once the contour edges have been detected and identified, the areas bounded by a contour representative of the level of the brine within the pond can then be compared to the derived area function, A(z), to determine the depth, z, of brine in the pond and hence the volume of brine in the pond.

Figure 7:
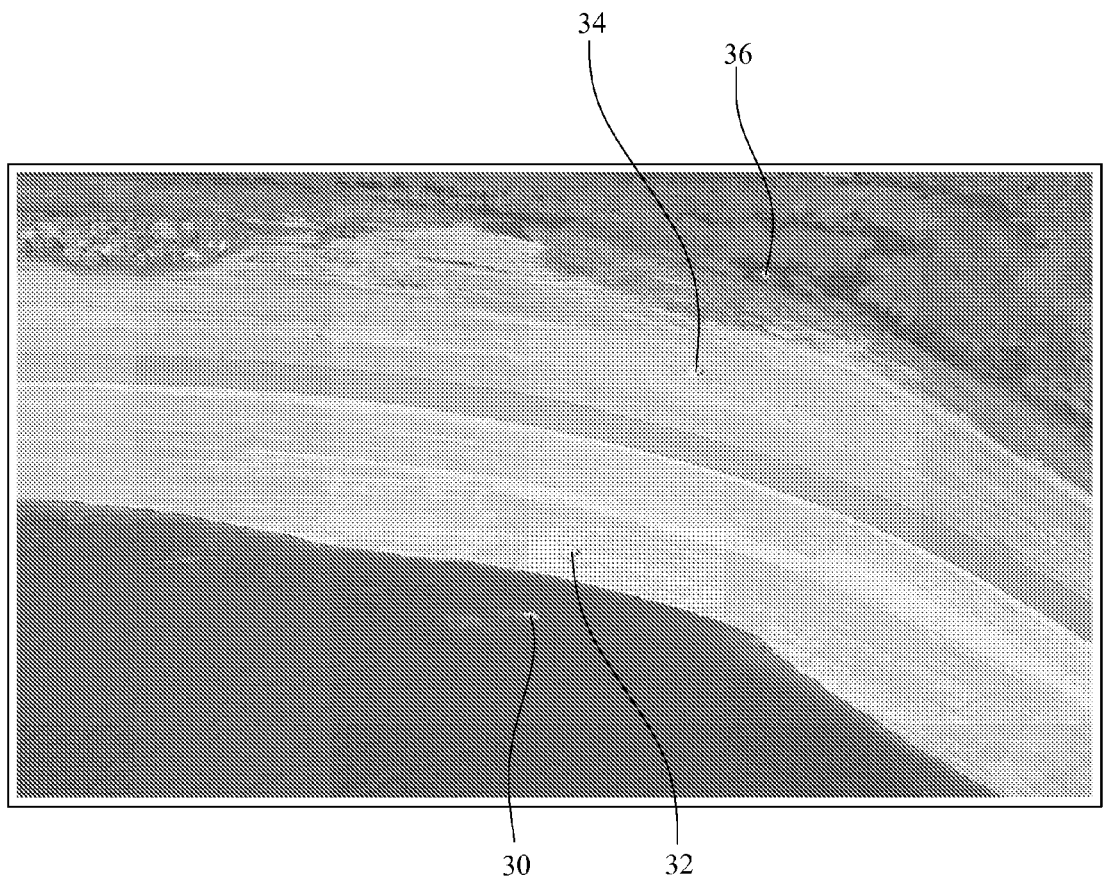
FIG. 7 is an image of the edge of a particular brine pond, showing a series of markers at spaced intervals near the edge of the brine pond.

In certain circumstances, the pond itself may contain physical markers and/or height markings which can be used to determine the pond depth. For example, FIG. 7 is an image of the edge of a particular brine pond. As shown in FIG. 7, there is a series of markers 30, 32, 34, 36 at spaced intervals near the edge of the brine pond. The positions of these markers 30, 32, 34, 36 are fixed. Thus, the depth, z, can be estimated by measuring linear distances in image pixels from one or more of the markers 30, 32, 34, 36 to the edge of the brine in the pond.

Finally, the amount of the liquid energy commodity in storage is determined, as indicated by block 314 of FIG. 8. In many cases, the estimated volume of the brine pond is assumed to be approximately equal to the volume of the liquid energy commodity in storage in an underground cavern associated with the brine pond.

Once the analysis of each brine pond in a particular location is completed, and as indicated by block 320 of FIG. 8, information about the estimated volumes can then be communicated to market participants and other interested parties, i.e., third parties who would not ordinarily have ready access to such information about the amount of liquid energy commodity in underground storage at a given time. Of course, by summing the volumes in all of the brine ponds or in a grouping of selected brine ponds, information about the total amount of liquid energy commodities at the particular location or in the grouping of selected brine ponds (for example, brine ponds corresponding to storage owned by a particular company or the amounts of specific liquid hydrocarbons) can also be calculated and communicated to market participants and other interested parties. It is contemplated and preferred that such communication to third parties could be achieved through electronic mail delivery and/or through export of the data to an access-controlled Internet web site, which end users can access through a common Internet browser program, such as Microsoft Internet Explorer®. Of course, communication of information and data to third parties may also be accomplished through a wide variety of other known communications media without departing from the spirit and scope of the present invention.

Figure 9:
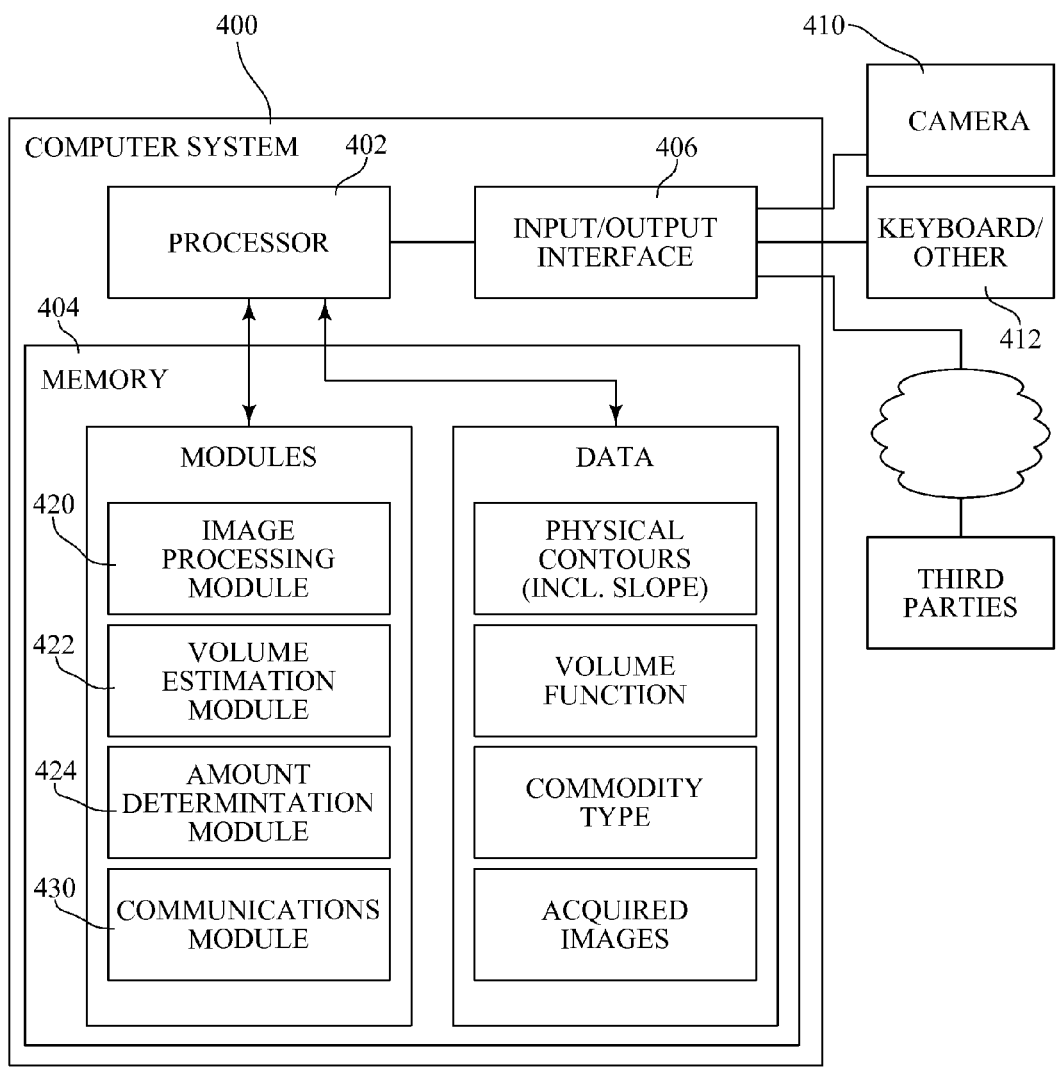
FIG. 9 is a schematic representation of the core components of a computer system in an exemplary implementation of the method and system of the present invention.

FIG. 9 is a schematic representation of the core components of a computer system in an implementation of the method and system of the present invention. As shown in FIG. 9, the computer system 400 generally comprises a processor 402, a memory (or memory component) 404, and an input/output interface 406. The input/output interface 406 communicates with and receives data from a camera 410, a keyboard 412, and other input devices, and then passes such data to the processor 402. The processor 402 is also in communication with the memory 404, which stores multiple modules, including: (a) an image processing module 420; (b) a volume estimation module 422; (c) an amount (of liquid energy commodity) determination module 424; and (d) a communications module 430. The processor 402 executes the programs of instructions embodied in each of these modules. The memory 404 also stores certain data elements which the processor can access and use in executing the instructions, such as (a) physical contours of each brine pond, including slope; (b) the volume function; (c) the type of liquid energy commodity; and (d) acquired images.

It should also be noted that, in some cases, a number of brine ponds may correspond to a number of caverns. For example, and referring back to FIG. 1, this particular brine pond has a maximum volume of approximately 480,000 m$^3$ and is associated with four separate underground caverns with a total capacity of 3 million barrels of crude oil. In such cases, the mapping of caverns to ponds would also be stored in the database, so that volume estimates associated with a group of ponds can be used to determine volumes stored in the corresponding caverns.

As a further refinement, some underground storage facilities use aboveground buffer tanks to batch process the injections and withdrawals to and from the interconnecting transportation infrastructure, which includes the pipelines coming into and leaving the facility that carry the liquid energy commodity. This operational technique is used to maintain pressure and to account for the rate of transfer to and/or from the facility being faster than the rate of transfer to and/or from the transportation infrastructure. When buffer tanks are used, different tanks may be used for the buffering of different liquid energy commodities.

When buffer tanks are used to batch process underground storage injections or withdrawals, the tanks may be monitored with the methods described in commonly owned and co-pending U.S. patent application Ser. No. 13/089,674 entitled "Method and System for Determining an Amount of a Liquid Energy Commodity Stored in a Particular Location" and filed on Apr. 19, 2011, which is incorporated herein by reference. By monitoring the tank volumes at specified intervals, liquid energy commodities displaced using the same brine pond can be differentiated.

As a further refinement, the amount of precipitation falling into a particular brine pond may be measured (for example, by using a rain gage) or calculated from publicly available data to improve the accuracy of the determination of the amount of the liquid energy commodity in storage in an underground cavern associated with the brine pond.

As a further refinement, the amount of liquid evaporated from a particular brine pond may be estimated from nearby measurements of evaporation or may be modeled from publicly available weather data to improve the accuracy of the determination of the amount of the liquid energy commodity in storage in an underground cavern associated with the brine pond.

As a further refinement, the perimeter of the transformed, top-of-pond coordinates may be scaled up to the physical perimeter of the brine pond to account for any inaccuracies in the linear coordinate transformation model. The scaling may be applied to the level-of-pond coordinates or the final volume estimate to improve accuracy.

As a further refinement, the pumping machinery, along with the pumping exhaust and pipelines leading to and from a particular underground cavern, may be monitored with infrared imaging to determine more information about the operational dynamics of the underground cavern. In this way, it is contemplated that the volumes stored in multiple caverns within the same storage facility could be differentiated. Using the information acquired from research (for example, information acquired from publicly available engineering plans for the facility) about which cavern is used for what liquid energy commodity, the total volume in storage could be broken down by liquid energy commodity.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A method for determining an amount of a liquid energy commodity in storage in an underground cavern based on an estimation of a volume of a brine in a brine pond associated with the underground cavern, comprising the steps of:

establishing a volume function for the brine pond based on physical contours of the brine pond, and storing the volume function in a database;

acquiring an image of the brine pond at a subsequent time;

transmitting the acquired image to a central processing facility;

analyzing, by a processor of a computer system, the acquired image to calculate a depth of the brine in the brine pond;

estimating, by the processor of the computer system, the volume of the brine in the brine pond based on the calculated depth and using the volume function stored in the database;

determining, by the processor of the computer system, the amount of the liquid energy commodity in storage in the underground cavern associated with the brine pond based on the estimated volume of the brine in the brine pond; and communicating information about the amount of the liquid energy commodity in storage to a third-party market participant.

2. The method as recited in claim 1, in which the liquid energy commodity is crude oil.

3. The method as recited in claim 1, in which the liquid energy commodity is natural gas liquids.

4. A method for determining a volume of a liquid in a pond, comprising the steps of:
   establishing a volume function for the pond based on physical contours of the pond, and storing the volume function in a database;
   acquiring, an image of the pond at a subsequent time;
   transmitting the acquired image to a central processing facility;
   identifying a first contour in the acquired image at or near a top edge of the pond;
   identifying a second contour in the acquired image representative of a level of the liquid in the pond;
   determining, by a processor of a computer system, an average distance between the first contour and the second contour;
   calculating, by the processor of the computer system, a depth of the liquid in the pond based on the average distance;
   estimating, by the processor of the computer system, the volume of the liquid in the pond based on the calculated depth and using the volume function stored in the database; and
   communicating information about the volume of the liquid in the pond to a third-party market participant.

5. The method as recited in claim 4, wherein the step of establishing the volume function includes the sub-steps of:
   using a camera to acquire an image of the pond in a substantially empty state;
   tracing two or more contours over the acquired image;
   digitizing the two or more contours into X-Y coordinates;
   calculating an area bounded by each of the two or more contours;
   determining the depth for each of the two or more contours; and
   calculating an area function as a function of the determined depth.

6. A method for determining a volume of a liquid in a pond, wherein a volume function stored in a memory component provides an estimate of a volume of the liquid in the pond as a function of a depth of the liquid in the pond, comprising the steps of:
   using a camera to acquire an image of the pond;
   using a computer system to
      (a) identify a first contour in the acquired image at or near a top edge of the pond,
      (b) identify a second contour in the acquired image representative of a level of the liquid in the pond,
      (c) determine an average distance between the first contour and the second contour by making a number of discrete measurements between the first contour and the second contour,
      (d) calculate a depth of the liquid in the pond based on the average distance, and
      (e) estimate a volume of the liquid in the pond based on the calculated depth and using, the volume function; and
   using the computer system to communicate information about the volume of the liquid in the pond to a third-party market participant.

7. A method in a computer system for determining a volume of a liquid in a pond, comprising the steps of:
   storing in a memory of the computer system a slope of a wall of the pond as a function of a location on a perimeter of the pond;
   storing in the memory of the computer system a volume function for determining a volume of the pond as a function of a depth of the pond;
   at a later time, receiving into the memory of the computer system a digital image of the pond containing an unknown amount of the liquid;
   processing, by a processor of the computer system, the digital image to determine a first contour representing a top edge of the pond in the digital image and a second contour representing a level of the liquid of the pond in the digital image;
   determining, by the processor of the computer system, an average distance between the first contour and the second contour from a predetermined number of discrete measurements;
   determining, by the processor of the computer system, and based on the average distance and the slope of the wall of the pond, a depth of the liquid in the pond; and
   estimating, by the processor of the computer system, and based on the depth of the liquid and the volume function, the volume of the liquid in the pond.

8. The method as recited in claim 7, and further comprising the steps of:
   storing in the memory of the computer system a first digitized contour representing a bottom of the pond, a second digitized contour representing a maximum level of the pond, and a third digitized contour representing the top edge of the pond; and
   upon receiving into the memory of the computer system the digital image of the pond containing the unknown amount of the liquid, transforming, by the processor of the computer system, using a generalized coordinate transform on the first contour to scale, shear, and rotate the first contour to match the third digitized contour representing the top edge of the pond which was previously stored in the memory of the computer system, and then applying the generalized coordinate transform to the second contour.

\* \* \* \* \*

UNITED STATES PATENT AND TRADEMARK OFFICE
CERTIFICATE OF CORRECTION

| | | |
|---|---|---|
| PATENT NO. | : 8,676,520 B2 | Page 1 of 1 |
| APPLICATION NO. | : 13/899688 | |
| DATED | : March 18, 2014 | |
| INVENTOR(S) | : Olson et al. | |

It is certified that error appears in the above-identified patent and that said Letters Patent is hereby corrected as shown below:

IN THE CLAIMS:

In claim 6, col. 10, line 8, delete "using," and replace with "using"

Signed and Sealed this
Tenth Day of June, 2014

Michelle K. Lee
*Deputy Director of the United States Patent and Trademark Office*